US006247668B1

(12) United States Patent
Reysa et al.

(10) Patent No.: US 6,247,668 B1
(45) Date of Patent: Jun. 19, 2001

(54) AUXILIARY POWER AND THRUST UNIT

(75) Inventors: Gary D. Reysa, Bellevue; Lynn A. Swenson, Lynnwood; Robert A. Hutchison, Seattle; Kenny L. Fung, Lynnwood, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/353,346

(22) Filed: Jul. 15, 1999

(51) Int. Cl.[7] .................................................... B64D 27/00

(52) U.S. Cl. ................................ 244/58; 244/54; 244/55; 244/53 B

(58) Field of Search ................................. 244/58, 54, 55, 244/53 B

(56) References Cited

U.S. PATENT DOCUMENTS

| | | | |
|---|---|---|---|
| 3,489,377 | 1/1970 | Pearson et al. . | |
| 3,568,958 * | 3/1971 | Bohre | 244/58 |
| 3,678,690 | 7/1972 | Shohet et al. . | |
| 3,957,229 | 5/1976 | Davis . | |
| 4,089,493 | 5/1978 | Paulson . | |
| 4,130,258 | 12/1978 | Fox . | |
| 4,418,879 | 12/1983 | Vanderleest . | |
| 4,456,204 | 6/1984 | Hapke . | |
| 4,684,081 | 8/1987 | Cronin . | |
| 4,721,271 | 1/1988 | Goldstein et al. . | |
| 5,480,107 | 1/1996 | Bacon . | |
| 5,529,263 | 6/1996 | Rudolf . | |
| 5,655,359 * | 8/1997 | Campbell et al. | 244/58 |
| 5,967,461 * | 10/1999 | Farrington | 244/58 |

OTHER PUBLICATIONS

Hawker Siddeley Trident 3B, p. 122–123, Unknown origin.
Hawker Siddeley Pushes Trident 3 Effort, Aviation Week & Space Technology, Apr. 10, 1967, p. 47–48.
Trident With A Fourth Prong, Flight International, Dec. 18, 1969, 6 pages.
Flight International Collection, Picture Library, Fax date Aug. 6, 1978, pp. 1–5.
Flight International, Jul. 15–21, 1998, p. 5.

* cited by examiner

*Primary Examiner*—Galen L. Barefoot
(74) *Attorney, Agent, or Firm*—Christensen O'Connor Johnson Kindness PLLC

(57) ABSTRACT

An improvement to an aircraft is provided in the form of an aircraft auxiliary power and thrust unit located in the tail cone of the aircraft. The unit includes a turbofan engine, an air intake opening, an inlet duct extending between the air intake opening and the turbofan engine, a transmission assembly, and various auxiliary equipment. The engine includes a forward-facing main turbine shaft. The air intake opening is located in the tail cone at a body station location forward of the engine. The transmission assembly includes a drive shaft mounted axially to the main turbine shaft and extends forward through the inlet duct through a sealed opening in the inlet duct. The auxiliary equipment is also located in the tail cone, forward of the turbofan engine. The transmission assembly is releasably connected to the auxiliary equipment. In a first operating mode, the engine is operated at a low setting to power the auxiliary equipment. In a second operating mode, the turbofan engine is used to provide thrust and operate auxiliary equipment.

11 Claims, 3 Drawing Sheets

40
42
16
22
20
14
12
10

14
32
32
12
34
36
32
32

AUXILIARY POWER AND THRUST UNIT

FIELD OF THE INVENTION

The present invention relates to aeronautics and aircraft power plants, and more particularly, to the production of auxiliary power in aircraft.

BACKGROUND OF THE INVENTION

Auxiliary power units (APUs) are currently used on board aircraft to provide power to support pressurized hydraulic systems, environmental control systems, and electrical systems. APU support is generally provided while the aircraft is on the ground during loading and unloading of passengers. During flight, APUs are shut down or operated only during an emergency. APUs can be problematic in that they are a significant source of weight and cost to the aircraft, while only providing short term services while on the ground.

Thus, a need exists for a more efficient system of auxiliary power. The present invention is directed to fulfilling this need by describing an auxiliary power design that provides additional thrust for takeoff and climb in addition to providing power for running conventional auxiliary equipment.

SUMMARY OF THE INVENTION

An improvement to an aircraft is provided in the form of an aircraft auxiliary power and thrust unit located in the tail cone of the aircraft. The unit includes a turbofan engine, an air intake opening, an inlet duct extending between the air intake opening and the turbofan engine, a transmission assembly, and various auxiliary equipment. The engine includes a forward facing main turbine shaft. The air intake opening is located in the tail cone at a body station location forward of the engine. The transmission assembly includes a drive shaft mounted axially to the main turbine shaft and extends forward through the inlet duct through a sealed opening in the inlet duct. The auxiliary equipment is also located in the tail cone, forward of the turbofan engine. The transmission assembly is releasably connected to the auxiliary equipment. In a first operating mode, the engine is operated at a low setting to power the auxiliary equipment. In a second operating mode, the turbofan engine is used to provide thrust and also to drive auxiliary equipment. Various types of auxiliary equipment may be used with the present invention, such as a generator, a hydraulic pressure supply unit, and a compressor.

In one embodiment, the turbofan engine is sized to provide a maximum thrust of about 18000 pounds or less. In another embodiment, the engine provides maximum thrust in the range of about 8000 pounds to about 12000 pounds. The engine is installed in the tail cone using various bracket mounts located radially about the engine and attached to structural members in the tail cone. In one embodiment, the tail cone includes a pair of cowl doors that rotate outwardly about longitudinal axes located on each side of the tail cone; the cowl doors providing access into the tail cone for both installing and maintaining the engine.

In accordance with further aspects of this invention, a controller is electronically connected to the turbofan engine and the auxiliary equipment. During the first operating mode, the controller operates the engine at a low power setting and controls the auxiliary equipment to provide auxiliary services. During the second operating mode, the controller operates the engine to provide thrust and auxiliary power to the aircraft systems.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
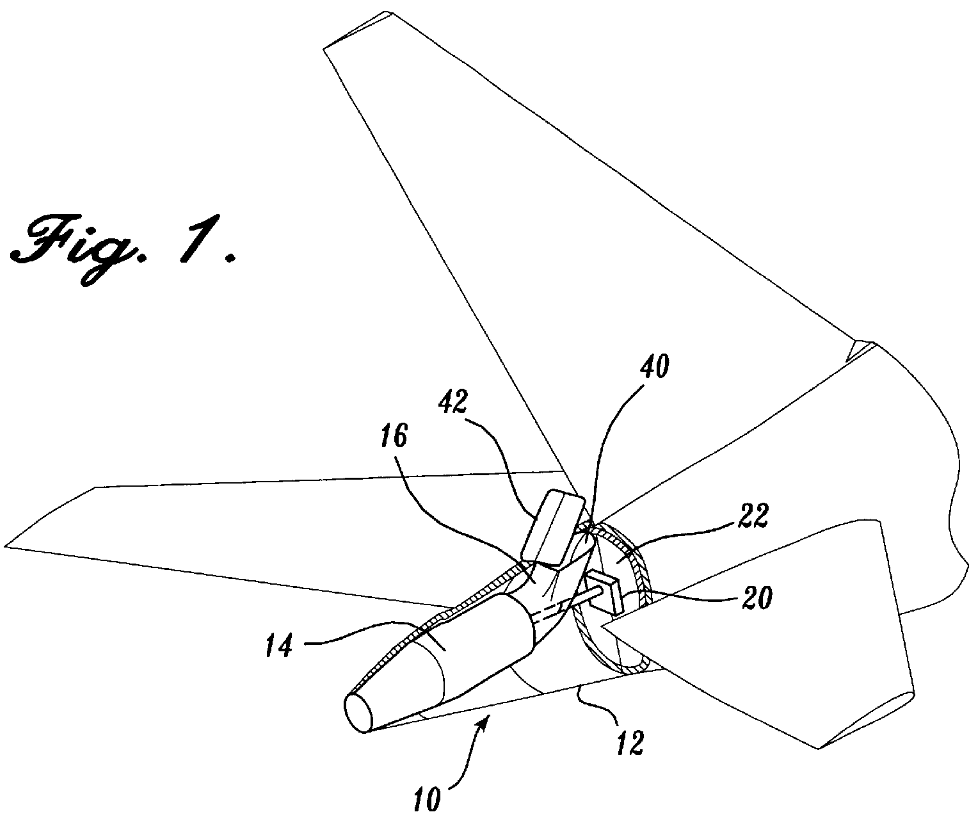
FIG. 1 is a perspective view of portions of an installed auxiliary power and thrust unit formed in accordance with the present invention.

The present invention auxiliary power and thrust unit (APTU) is a replacement for a conventional aircraft auxiliary power unit (APU) systems. An APTU formed in accordance with the present invention provides power to support conventional auxiliary equipment, as well as providing takeoff and in-flight thrust. Referring to FIG. 1, the APTU 10 is located in an aircraft tail cone 12. The APTU includes a turbofan engine 14, an inlet duct 16, and a transmission assembly 18 (see FIG. 2). These components are arranged to connect to conventional auxiliary equipment 20 (e.g., generator, hydraulic pressure supply unit, compressor, etc.) that are also located in the tail cone, aft of the rearmost fuselage bulkhead and further cordoned off by a conventional fire wall 22.

Figure 2:
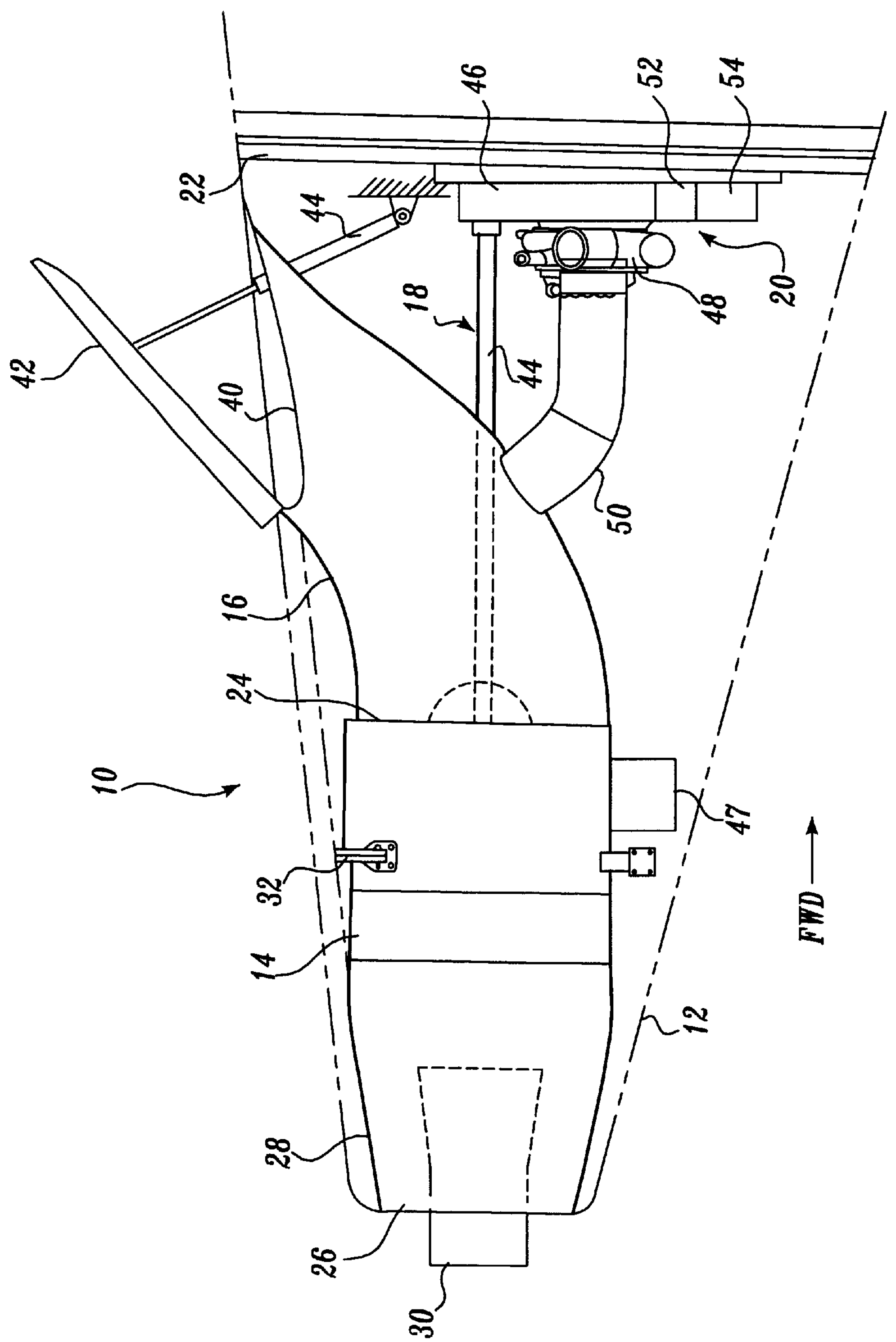
FIG. 2 is a schematic side elevational view of an auxiliary power and thrust unit formed in accordance with the present invention.

In more detail and referring to FIG. 2, the turbofan engine 14 includes an intake end 24 and an exhaust end 26. The engine is located in the interior of the tail cone 12 in a fore and aft orientation so that the turbofan intake end 24 is forward of the turbofan exhaust end. The exhaust end 26 is arranged to expel engine exhaust out the rear of the tail cone. In the embodiment shown in FIG. 1, the engine 14 includes an exhaust nozzle 28 with an engine exhaust cone 30 that extends out beyond the end of the tail cone 12. Other exhaust arrangements may be used. For example, a variable geometry exhaust nozzle may be used to reduce exhaust plume velocity, especially when on ground, and/or to reduce cruise drag by closing down and fairing engine exhaust.

The turbofan engine 14 is similar to conventional turbofan engines in that it includes a gas generator, a main turbine shaft, a fan, and a bypass duct. The turbofan of the present invention is different, however, in that its main turbine shaft is adapted to connect to the present invention transmission assembly 18. In one embodiment, the turbofan engine is an Allied Signal AE907, capable of providing maximum thrust in the range of about 8000 pounds to about 12000 pounds. In another embodiment, the engine provides thrust in an amount of about 18000 pounds or less. This aspect will vary, depending on the particular mission requirements. There are numerous other types, sizes, and configurations of turbofan engines that may be modified (or created) for use with the present invention APTU.

Figure 3:
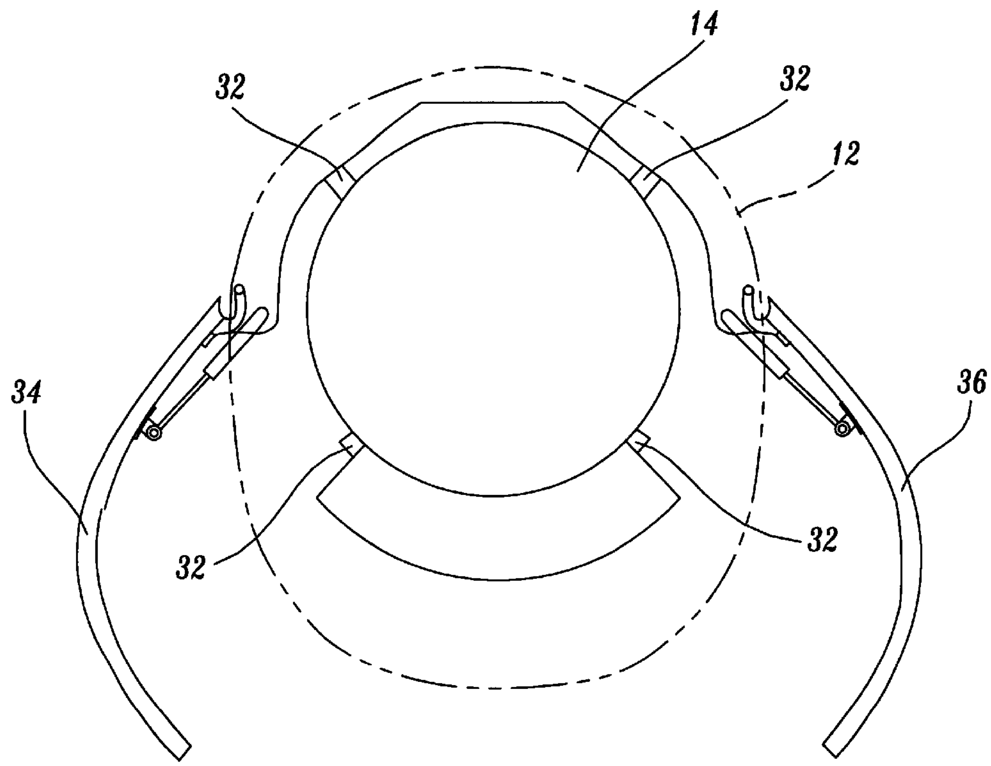
FIG. 3 is a front elevational schematic view of an auxiliary power and thrust unit showing one embodiment of its installation on an aircraft.

Referring to FIG. 3, the engine is supported within the tail cone by a number of engine mount brackets 32. The tail cone includes an internal structural frame (not shown) to which the brackets are attached. In one embodiment, a ring of brackets is located radially about the engine at a body-station corresponding approximately to the engine compressors (see FIG. 2). The tail cone 12 includes a pair of lower cowl doors 34, 36 that rotate outwardly about longitudinal axes located on each side of the tail cone. The cowl doors 34, 36 provide access into the tail cone for both installing and maintaining the engine.

Referring back to FIG. 2, the tail cone also includes an air intake opening 40 through an upper surface of the tail cone forward end. The air intake opening 40 is located at a body-station forward of the engine intake end. The opening 40 may be any shape such as circular, rectangular, etc. A variable position inlet door 42 is hinged to the tail cone 12 and is opened and closed via a linear actuator 44, or the like. The inlet duct 16 extends from the opening to the engine intake end 24. The door 42 preferably opens outward and into the oncoming airstream, i.e., in a forward direction. This aids in directing ambient air into the turbofan engine during flight. The engine air induction system, consisting of the variable position door 42, the intake opening 40, and the curved inlet duct 16, ensure aerodynamic matching, installed total pressure recovery, and compressor face distortion within limits.

During use of the APTU on ground, the engine itself will draw sufficient air with the door open without requiring an additional fan, however, one may be optionally used (not shown) if so desired. The inlet door and duct are preferably de-iced during inclement weather to prevent the formation of ice.

Various other arrangements and placements of the opening 40, door 42, and duct 16 are possible and are to be considered within the scope of this invention. In one alternative embodiment, the door is formed as two outward-opening doors hinged longitudinally along both sides of the opening. In another embodiment, there are two openings located to each side of the tail vertical stabilizer, each with its own separate door. In yet another embodiment, the opening is embedded in the leading edge of the vertical tail. Further, the door may be formed as two outward-opening doors hinged longitudinally along both sides of the opening. In each arrangement, the duct 16 is formed to direct air from the opening(s) to the engine intake end 24.

The inlet duct is formed of a heat resistant fire-proof material. In the embodiment shown in FIGS. 1 and 2, the opening 40 has a rectangular geometry and the inlet duct 16 has a rectangular geometry forward end that is attached to the opening via conventional fasteners. The inlet duct has a circular aft end connected to the turbofan engine at its fan cowl face via flexible quick-release device or the like. Other materials, geometries, and connection methods may be used as will be apparent to those skilled in the art upon reading this disclosure.

The transmission assembly 18 is provided to transmit rotary power from the engine main turbine shaft to various auxiliary equipment, such as those described below. The assembly 18 includes a drive shaft 44 mounted to the engine main turbine shaft. In one embodiment, as shown in FIGS. 1 and 2, the drive shaft is mounted axially to the shaft and extends through the inlet duct. To accommodate this arrangement, the inlet duct includes an opening through which the drive shaft can pass. The shaft is supported by sealed bearings at this opening to prevent moisture or debris from passing therebetween. The shaft preferably includes features which prevent imbalance as well. A gearbox 46 is attached to the fire wall and is connected to the distal end of the axially-mounted drive shaft 44. The auxiliary equipment 20 is attached to the gearbox 46. In another embodiment, the transmission assembly includes a drive shaft mounted perpendicular to the engine main turbine shaft to a gearbox located on the underside of the engine, such as within an engine accessories unit 47. Alternatively, a combination of an axially-mounted drive shaft and a transverse drive shaft may be used.

Still referring to FIG. 2, the auxiliary equipment 20 may include various conventional items such as an electrical generator, a hydraulic pressure supply unit, a compressor, etc. These components are preferably located in the tail cone 12 and mounted on a gearbox attached to structural members at the firewall 22. In the embodiment of FIG. 2, the drive shaft 44 is axially connected to a gearbox 46. The gearbox is connected to a compressor 48 that receives input air from an air supply duct 50 connected between the compressor 48 and the air inlet duct 16. The gearbox 46 further provides power to drive a hydraulic pressure supply unit 52 and an electrical generator 54. The forward end of the drive shaft 44 may be disengaged from the gearbox components by a powered clutch device within the gearbox when auxiliary services are not required. As will be appreciated, the engine is thus capable of serving two purposes—one, to provide thrust and, two, to provide rotary power to run auxiliary equipment.

Figure 4:
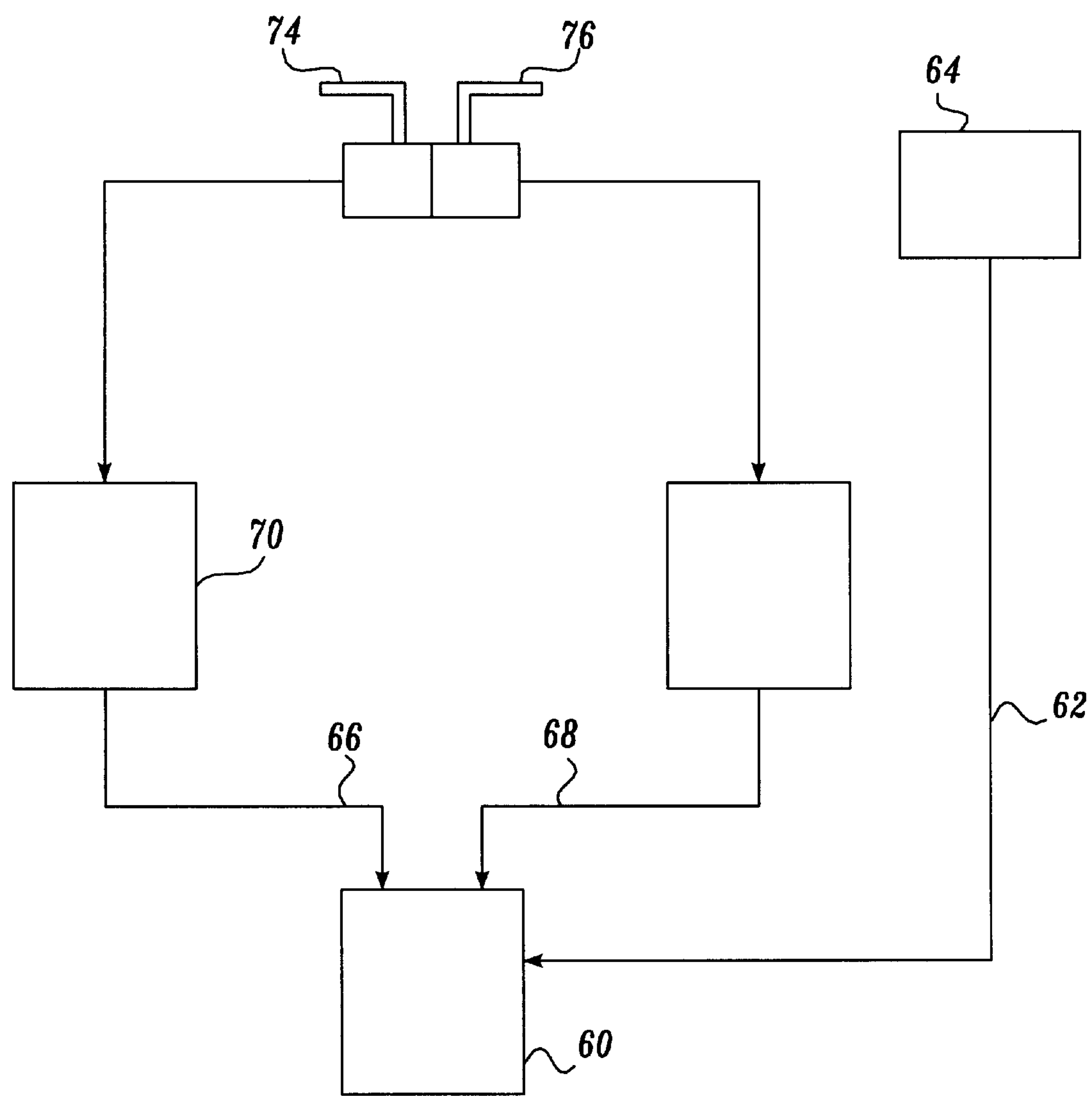
FIG. 4 is a control system diagram illustrating one embodiment of an APTU controller formed in accordance with the present invention.

The APTU may be controlled by various components (either dedicated or shared) and operated according to various schedules, depending on the needs of a particular aircraft application. In one embodiment, shown in FIG. 4, the APTU includes a electronic controller 60 that operates the APTU in an APU Mode and an APTU Mode. The APTU controller receives a signal input 62 from a mode selector switch 64 located in the flight deck. The switch 64 includes settings representative of the APU Mode and the APTU Mode. The APTU controller also receives signal inputs 66, 68 from aircraft left and right main engine electronic controllers 70, 72 which, in turn, receive inputs directly from the cockpit throttle levers 74, 76. In alternative embodiments, there may be any number of main engines, main engine controllers, and levers. Using the inputs from the main engines and the APTU mode selector switch, the APTU controller determines the appropriate action to take regarding the controlling of the APTU components.

When the APU Mode is selected (such as on-ground), the APTU controller 60 opens the inlet door 42, operates the turbofan engine 14 at a low power setting, engages the drive shaft 44 to the auxiliary equipment 20, and initiates activation of the desired auxiliary equipment. Power is thereby extracted from the turbofan engine to drive the auxiliary equipment via the drive shaft. The engine is preferably run at its minimum setting to allow efficient transmission of power. A low power setting will also increase engine life, reduce engine exhaust velocities and temperatures, and result in lower ramp noise levels.

When the APTU Mode is selected, the controller 60 opens the inlet door 42 and operates the turbofan engine 14 at a power setting commensurate with the main engine power settings, preferably based directly on the main engines' thrust lever position signals 66, 68 transmitted from the main engine controllers. In one arrangement, during takeoff the APTU engine is operated at idle thrust until the aircraft's main engines are advanced, at which time, the APTU engine is advanced to full throttle. The APTU controller continues operating the APTU engine at full thrust until takeoff is completed and the main engine thrust is reduced for climb. At that time, the APTU controller automatically reduces APTU engine thrust to the climb thrust rating. In the case of a main engine failure occurring prior to the decision speed for a refused takeoff, the APTU controller can automatically reduce the APTU engine to idle thrust or simply turn the engine off.

During cruise operation, the APTU is not normally used for providing thrust. Therefore, the inlet door 42 is closed to reduce drag. If auxiliary services are required during cruise, then the inlet door may be opened and the APTU started and run in the APU Mode. As will be appreciated by those with skill in the art upon reading this disclosure, alternative control logic may be used to operate the APTU in other desired manners. For example, the APTU engine thrust could be made to automatically increase to a high level when a main engine failure is detected.

The present invention APTU has numerous advantages. Most importantly, it increases the weight and cost efficiency of an aircraft by providing a single unit that can be used to run auxiliary equipment as well as provide thrust to improve the aircraft's takeoff field length and payload/range capability. In addition, the APTU provides a way to improve takeoff and climb performance of an aircraft in those cases where it is technically or economically inefficient or not feasible to increase the main engine thrust. Compared to the alternative of adding additional engines, the APTU provides the economic and efficiency advantages of fewer main engines, while providing improved takeoff and climb thrust characteristics similar to an aircraft with additional engines.

While the preferred embodiment of the invention has been illustrated and described, it will be appreciated that various changes can be made therein without departing from the spirit and scope of the invention. For example, the APTU engine cycle and design may be specifically chosen to minimize takeoff noise. This would allow overall aircraft noise to be reduced, or takeoff noise to be maintained at the same level and aircraft weight increased.

The embodiments of the invention in which an exclusive property or privilege is claimed are defined as follows:

1. In an aircraft having a tail cone located aft of a vertical stabilizer, the improvement comprising an aircraft auxiliary power and thrust unit including:

(a) a turbofan engine having an intake end, an exhaust end, and a main turbine shaft; the engine being located in the tail cone with the engine exhaust end arranged to expel engine exhaust out the rear of the tail cone;

(b) a single air intake opening located on an upper surface of the tail cone at a body station location forward of the engine intake end and aft of the vertical stabilizer; an inlet door being hinged to the tail cone at the single air intake opening for selectively allowing and prohibiting air input, the inlet door opening in a forward direction;

(c) an inlet duct extending between the air intake opening and the turbofan engine intake end;

(d) a transmission assembly including a drive shaft mounted to the engine main turbine shaft and a gearbox connected to the drive shaft; the drive shaft extending axially from the main turbine shaft and forward through the inlet duct through a sealed opening in the inlet duct, the gearbox and drive shaft being located forward of the turbofan engine; and (e) auxiliary equipment located in the tail cone and connected to the gear box;

wherein the unit includes a first operating mode in which the engine is operated at a low setting to power the auxiliary equipment and a second operating mode in which the turbofan engine is used to provide aircraft thrust and operate auxiliary equipment.

2. The aircraft auxiliary power and thrust unit according to claim 1, wherein the transmission assembly includes a gearbox connected to the drive shaft.

3. The aircraft auxiliary power and thrust unit according to claim 1, wherein the turbofan engine provides maximum thrust in an amount equal to or less than about 18000 pounds.

4. The aircraft auxiliary power and thrust unit according to claim 1, wherein the turbofan engine includes an exhaust nozzle with an exhaust cone that extends out the tail cone.

5. The aircraft auxiliary power and thrust unit according to claim 1, wherein the turbofan engine is installed in the tail cone using at least four different bracket mounts located radially about the engine.

6. The aircraft auxiliary power and thrust unit according to claim 1, wherein the tail cone includes a pair of cowl doors that rotate outwardly about longitudinal axes located on each side of the tail cone; the cowl doors providing access into the tail cone for both installing and maintaining the engine and auxiliary power components.

7. The aircraft auxiliary power and thrust unit according to claim 1, wherein the auxiliary equipment includes an electric generator connected to the gearbox.

8. The aircraft auxiliary power and thrust unit according to claim 7, wherein the auxiliary equipment further includes an hydraulic pressure supply unit connected to the gearbox.

9. The aircraft auxiliary power and thrust unit according to claim 7, wherein the auxiliary equipment further includes a compressor connected to the gearbox and an air supply duct connected between the compressor and the engine air inlet duct.

10. The aircraft auxiliary power and thrust unit according to claim 1, wherein the tail cone includes a fire wall forward of the unit and the auxiliary equipment is connected to and supported by the fire wall.

11. The aircraft auxiliary power and thrust unit according to claim 1, further comprising a controller electronically connected to the turbofan engine and the auxiliary equipment; wherein during the first operating mode the controller operates the engine at a low setting and operates the auxiliary equipment to provide auxiliary services; wherein during the second operating mode the controller opens the inlet door, operates the engine for producing thrust and driving auxiliary equipment.

* * * * *